United States Patent
Fletcher et al.

(10) Patent No.: US 9,657,748 B2
(45) Date of Patent: May 23, 2017

(54) PNEUMATICALLY ACTUATED VACUUM PUMP HAVING MULTIPLE VENTURI GAPS AND CHECK VALVES

(71) Applicants: David E. Fletcher, Flint, MI (US);
Brian M. Graichen, Leonard, MI (US);
Keith Hampton, Ann Arbor, MI (US)

(72) Inventors: David E. Fletcher, Flint, MI (US);
Brian M. Graichen, Leonard, MI (US);
Keith Hampton, Ann Arbor, MI (US)

(73) Assignee: DAYCO IP HOLDINGS, LLC, Troy, MI (US)

(*) Notice: Subject to any disclaimer, the term of this patent is extended or adjusted under 35 U.S.C. 154(b) by 299 days.

(21) Appl. No.: 14/452,651

(22) Filed: Aug. 6, 2014

(65) Prior Publication Data
US 2016/0040688 A1    Feb. 11, 2016

(51) Int. Cl.
*F02M 35/10* (2006.01)
*F04F 5/48* (2006.01)
(Continued)

(52) U.S. Cl.
CPC ............... *F04F 5/20* (2013.01); *F02B 37/04* (2013.01); *F02B 37/164* (2013.01); *F02M 35/02* (2013.01); *F02M 35/104* (2013.01); *F02M 35/10118* (2013.01); *F02M 35/10229* (2013.01); *F02M 35/10255* (2013.01); *F04F 5/44* (2013.01); *Y02T 10/144* (2013.01)

(58) Field of Classification Search
CPC ............... B01F 5/0413; B01F 13/0027; B01F 2215/0029; B01F 3/04; F16K 15/14; F16K 11/22; F04F 5/20; F04F 5/02; F04F 5/16; F02B 37/04

USPC .. 123/389, 41.86, 406.69, 184.53, 520, 337, 123/345; 137/888, 526, 112, 113; 261/76, 34.2; 417/189
See application file for complete search history.

(56) References Cited

U.S. PATENT DOCUMENTS 1,845,969 A   2/1932  Hueber
2,183,561 A   12/1939 Hamblin
(Continued)

FOREIGN PATENT DOCUMENTS

DE    4310761    10/1994
GB    2129516    5/1984

OTHER PUBLICATIONS

PCT, International Search Report and Written Opinion, PCT/US2015/039950 (Oct. 5, 2015).
(Continued)

*Primary Examiner* — Carlos A Rivera
*Assistant Examiner* — Syed O Hasan
(74) *Attorney, Agent, or Firm* — Thompson Hine LLP

(57) ABSTRACT

A pneumatically actuated vacuum pump is disclosed, and includes a body defining a converging motive section, a diverging discharge section, at least one suction port, and a Venturi gap. The Venturi gap is located between an outlet end of the converging motive section and an inlet end of the diverging discharge section. The pneumatically actuated vacuum pump also includes a first check valve fluidly connected to the Venturi gap and the suction port. The pneumatically actuated vacuum pump further includes at least one second gap located in the diverging discharge section of the body downstream of the Venturi gap. A second check valve is fluidly connected to the second gap.

18 Claims, 18 Drawing Sheets
(5 of 18 Drawing Sheet(s) Filed in Color)

(51) Int. Cl.
  *G05D 11/00*  (2006.01)
  *F02P 5/00*  (2006.01)
  *F02D 11/02*  (2006.01)
  *F04F 5/20*  (2006.01)
  *F02B 37/04*  (2006.01)
  *F02M 35/02*  (2006.01)
  *F02M 35/104*  (2006.01)
  *F04F 5/44*  (2006.01)
  *F02B 37/16*  (2006.01)

(56) References Cited

U.S. PATENT DOCUMENTS

| | | |
|---|---|---|
| 3,234,932 A | 2/1966 | Bird et al. |
| 3,754,841 A | 8/1973 | Grabb et al. |
| 4,211,200 A | 7/1980 | Rocchio et al. |
| 4,308,138 A | 12/1981 | Woltman |
| 4,499,034 A | 2/1985 | McAllister |
| 4,519,423 A | 5/1985 | Ho et al. |
| 4,554,786 A | 11/1985 | Takeuchi et al. |
| 4,634,559 A | 1/1987 | Eckert |
| 5,005,550 A | 4/1991 | Bugin, Jr. et al. |
| 5,108,266 A | 4/1992 | Hewitt |
| 5,188,141 A | 2/1993 | Cook et al. |
| 5,291,916 A | 3/1994 | Kloosterman et al. |
| 5,816,446 A | 10/1998 | Steindorf et al. |
| 6,035,881 A | 3/2000 | Emmerich et al. |
| RE37,090 E | 3/2001 | Kloosterman et al. |
| 6,220,271 B1 | 4/2001 | Emmerich et al. |
| 7,722,132 B2 | 5/2010 | Carlsson |
| 2004/0036185 A1 | 2/2004 | Garcia |
| 2004/0113288 A1 | 6/2004 | Korzeniowski |
| 2005/0061378 A1 | 3/2005 | Foret |
| 2006/0016477 A1 | 1/2006 | Zaparackas |
| 2007/0152355 A1 | 7/2007 | Hartley |
| 2011/0132311 A1 | 6/2011 | Pursifull et al. |
| 2011/0186151 A1 | 8/2011 | Sparazynski |
| 2013/0213510 A1 | 8/2013 | Burnham et al. |
| 2013/0233276 A1 | 9/2013 | Pursifull et al. |
| 2013/0233287 A1 | 9/2013 | Leone |
| 2013/0340732 A1 | 12/2013 | Pursifull et al. |
| 2014/0197345 A1 | 7/2014 | Graichen et al. |
| 2014/0360607 A1 | 12/2014 | Fletcher et al. |
| 2015/0114348 A1 | 4/2015 | Pursifull et al. |
| 2015/0114350 A1 | 4/2015 | Pursifull |

OTHER PUBLICATIONS

PCT, International Search Report and Written Opinion, PCT/US2015/043911 (Nov. 6, 2015).
US, Non-Final Office Action; U.S. Appl. No. 14/294,727; (Oct. 8, 2015).
US, Final Office Action; U.S. Appl. No. 14/294,727; (Apr. 22, 2016).
CN, Office Action and Search Report with English translation; Chinese Patent Application No. 201410413220.7; (Nov. 14, 2016).
PCT, International Search Report and Written Opinion, PCT/US2014/041250 (Oct. 27, 2014).

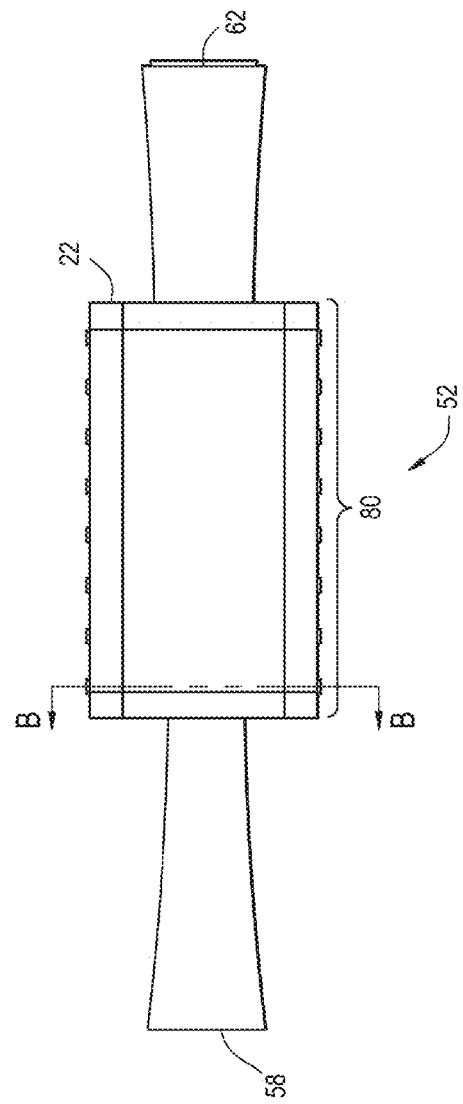

FIG. 8

| motive pressure | 201325 Pa |
| --- | --- |
| discharge pressure | 101325 Pa |

| | | vacuum canister pressure | | | | | |
| --- | --- | --- | --- | --- | --- | --- | --- |
| | | 100000 Pa | 90000 Pa | 80000 Pa | 70000 Pa | 66000 Pa | 65420 Pa |
| | closing pressure | check valve status | check valve status | check valve status | check valve status | check valve status | check valve status |
| venturi gap 82A | 77935 | open | open | open | closed | closed | closed |
| venturi gap 82B | 80155 | open | open | closed | closed | closed | closed |
| venturi gap 82C | 67841 | open | open | open | open | closed | closed |
| venturi gap 82D | 65416 | open | open | open | open | open | closed |

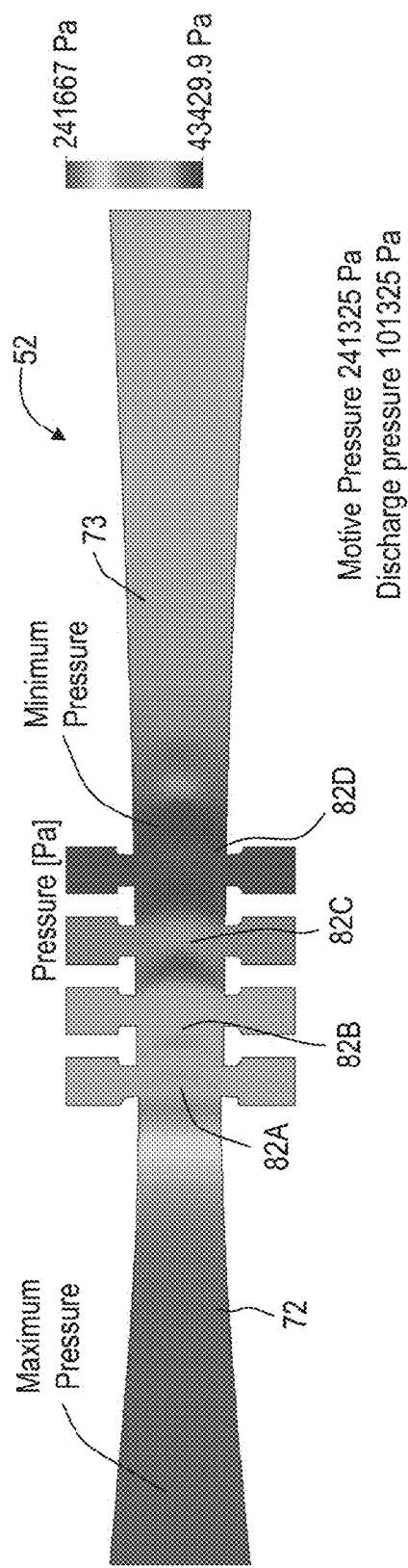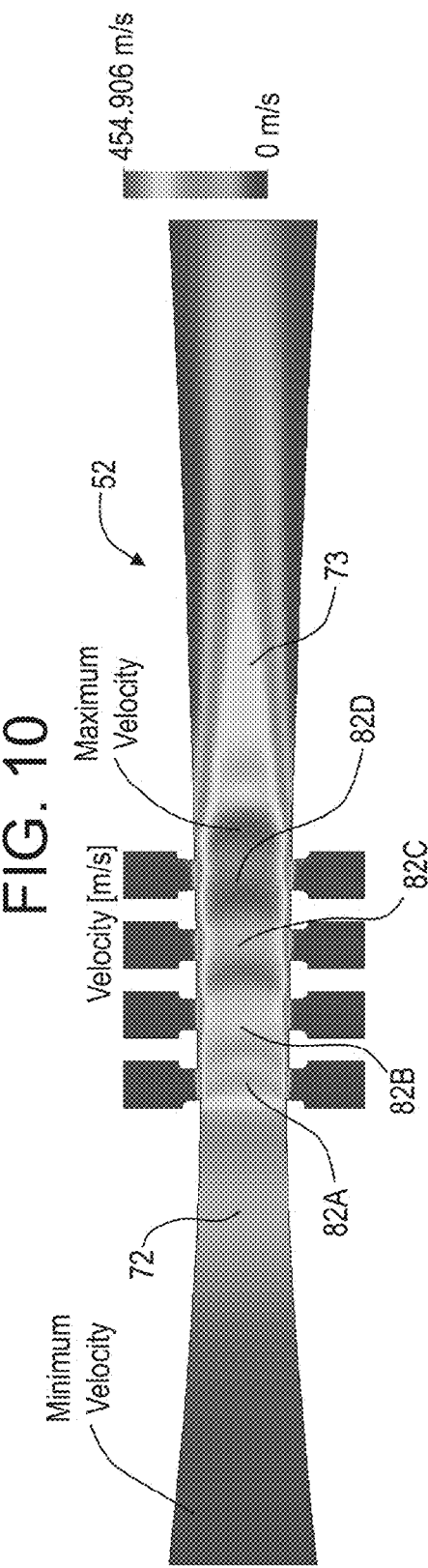

FIG. 11

| motive pressure | 241325 Pa | | | | | | | |
|---|---|---|---|---|---|---|---|---|
| discharge pressure | 101325 Pa | | | | | | | |
| | | vacuum canister pressure | | | | | | |
| | | 100000 Pa | 90000 Pa | 80000 Pa | 70000 Pa | 66000 Pa | 57440 Pa | |
| | closing pressure | check valve status | check valve status | check valve status | check valve status | check valve status | check valve status | |
| venturi gap 82A | 93723 | open | closed | closed | closed | closed | closed | |
| venturi gap 82B | 96458 | open | closed | closed | closed | closed | closed | |
| venturi gap 82C | 78020 | open | open | open | closed | closed | closed | |
| venturi gap 82D | 57434 | open | open | open | open | open | closed | |

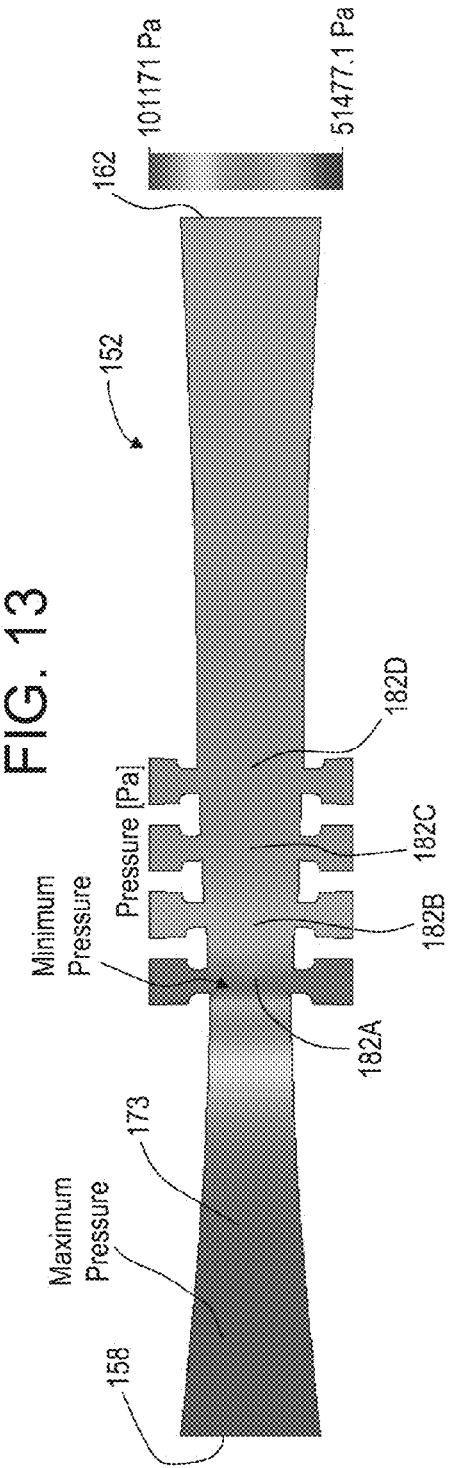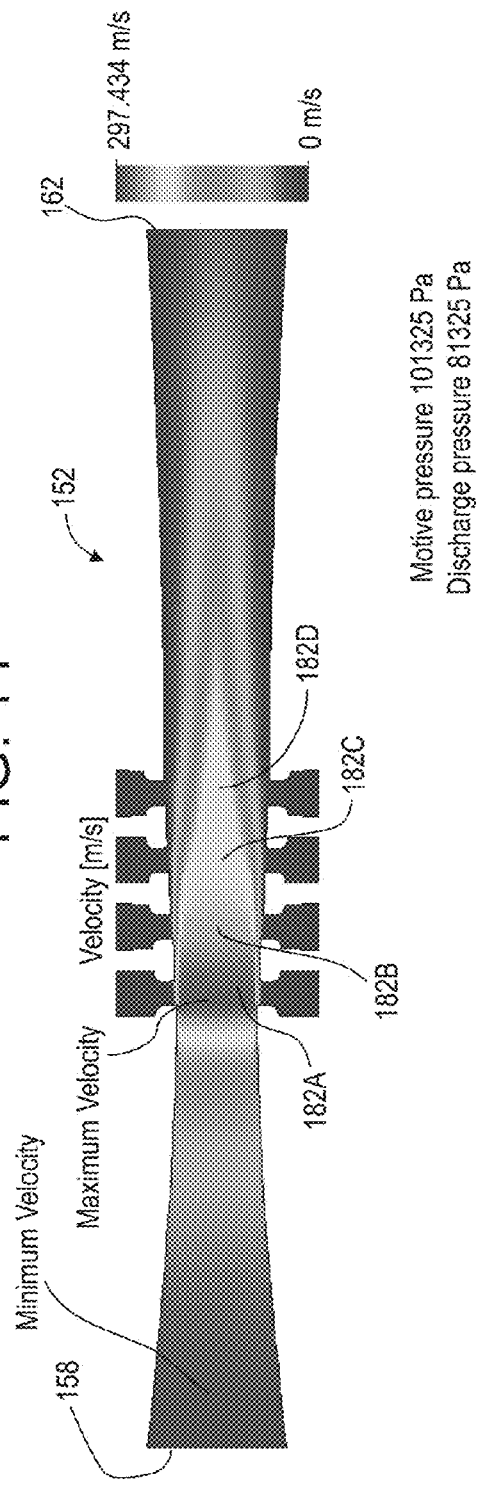

FIG. 15

| motive pressure | 101325 Pa | | | | | | |
|---|---|---|---|---|---|---|---|
| discharge pressure | 81325 Pa | | | | | | |
| | | vacuum canister pressure | | | | | |
| | | 100000 Pa | 90000 Pa | 80000 Pa | 70000 Pa | 66000 Pa | 58900 Pa |
| | closing pressure | check valve status | check valve status | check valve status | check valve status | check valve status | check valve status |
| venturi gap 182A | 58906 | open | open | open | open | open | closed |
| venturi gap 182B | 66732 | open | open | open | open | closed | closed |
| venturi gap 182C | 72603 | open | open | open | closed | closed | closed |
| venturi gap 182D | 75558 | open | open | open | closed | open | closed |

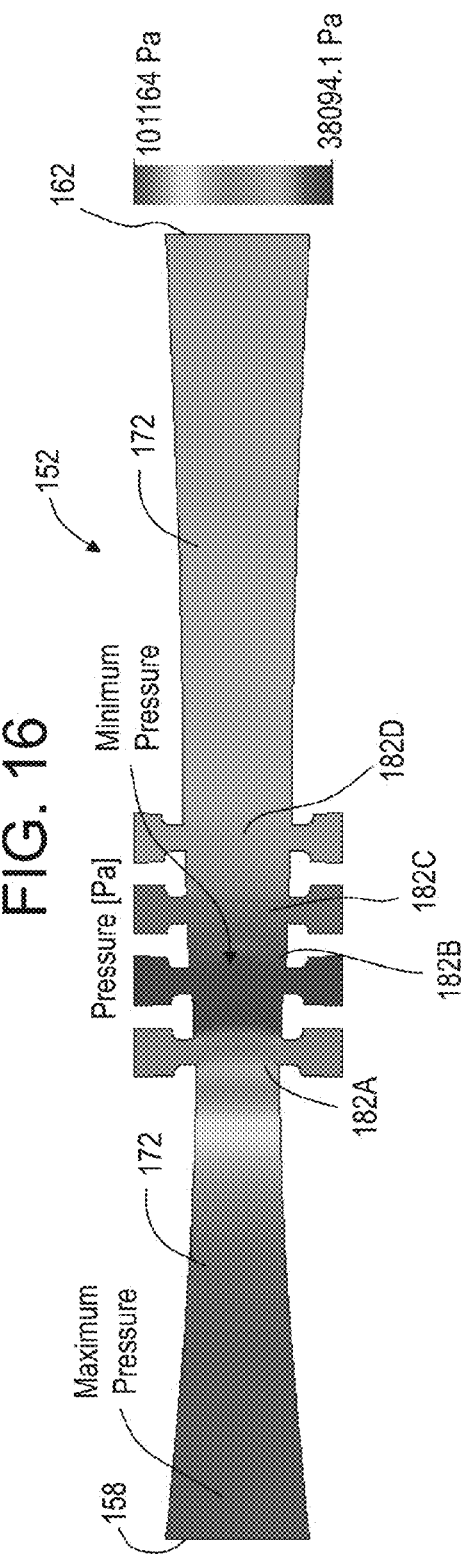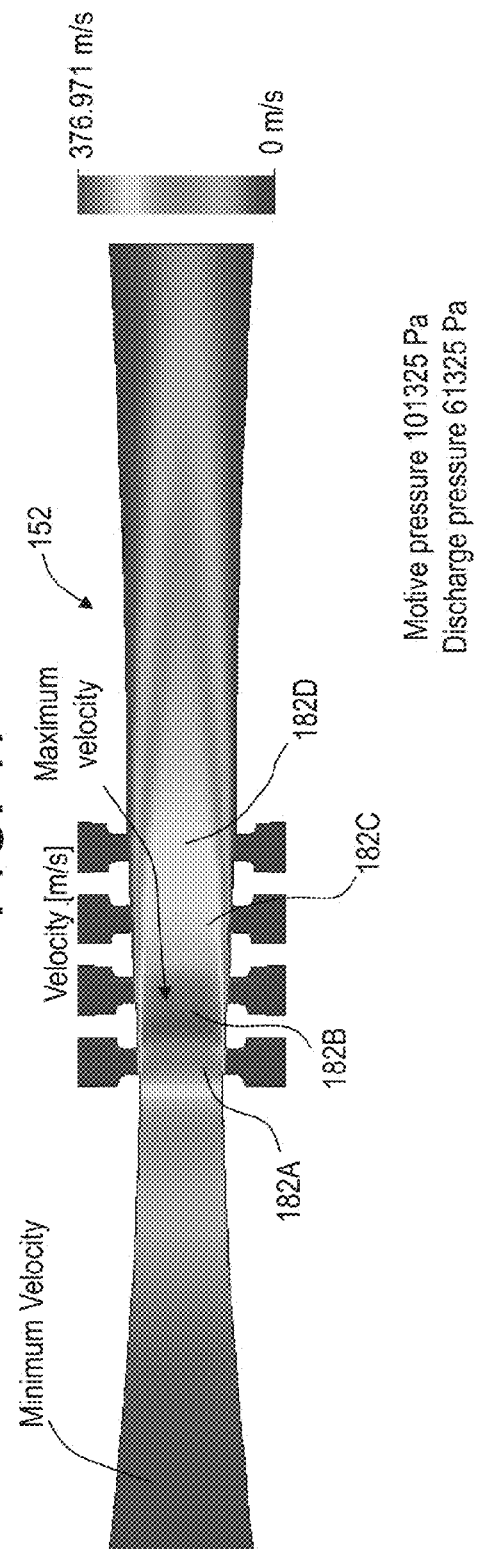

FIG. 18

| motive pressure | 101325 Pa |
| discharge pressure | 61325 Pa |

| | | vacuum canister pressure | | | | | |
|---|---|---|---|---|---|---|---|
| | | 100000 Pa | 90000 Pa | 80000 Pa | 50000 Pa | 40000 Pa | 39900 Pa |
| | closing pressure | check valve status | check valve status | check valve status | check valve status | check valve status | check valve status |
| venturi gap 182A | 49496 | open | open | open | open | closed | closed |
| venturi gap 182B | 39990 | open | open | open | open | open | closed |
| venturi gap 182C | 47115 | open | open | open | open | closed | closed |
| venturi gap 182D | 51753 | open | open | open | closed | closed | closed |

FIG. 21

| motive pressure | 101325 Pa |
| discharge pressure | 41325 Pa |

| | | vacuum canister pressure | | | | | |
|---|---|---|---|---|---|---|---|
| | | 100000 Pa | 80000 Pa | 60000 Pa | 40000 Pa | 30000 Pa | 28400 Pa |
| | closing pressure | check valve status | check valve status | check valve status | check valve status | check valve status | check valve status |
| venturi gap 182A | 49374 | open | open | open | closed | closed | closed |
| venturi gap 182B | 32237 | open | open | open | open | closed | closed |
| venturi gap 182C | 31059 | open | open | open | open | closed | closed |
| venturi gap 182D | 28404 | open | open | open | open | open | closed |

PNEUMATICALLY ACTUATED VACUUM PUMP HAVING MULTIPLE VENTURI GAPS AND CHECK VALVES

TECHNICAL FIELD

This application relates to vacuum creation by a pneumatically actuated vacuum pump and, more particularly, to a pneumatically actuated vacuum pump that includes multiple venturi gaps and check valves.

BACKGROUND

In some vehicles vacuum is used to operate or assist in the operation of various devices. For example, vacuum may be used to assist a driver applying vehicle brakes, turbocharger operation, fuel vapor purging, heating and ventilation system actuation, and driveline component actuation. If the vehicle does not produce vacuum naturally, such as from the intake manifold, then a separate vacuum source is required to operate such devices. While an ejector can produce vacuum when supplied with boost vacuum, the depth of vacuum produced will be a function of the motive pressure.

In boosted engines where intake manifold pressures are often at pressures greater than atmospheric pressure, intake manifold vacuum may be replaced or augmented with vacuum from an ejector. An ejector, as used herein, is a converging, diverging nozzle assembly with three connections, a motive port connected to a pressure source above atmospheric pressure, a discharge port connected to atmospheric pressure, and a suction port connected to a device requiring vacuum. By passing pressurized air through the ejector, a low pressure region may be created within the ejector so that air can be drawn from a vacuum reservoir or may directly act on a device requiring vacuum, thereby reducing pressure within the vacuum reservoir or device requiring vacuum.

As used herein, an aspirator is a converging, diverging nozzle assembly with three connections, a motive port connected to the intake air of a non-boosted or normally aspirated engine at atmospheric pressure, a discharge port connected to the manifold vacuum located downstream of the throttle, and a suction port connected to a device requiring vacuum. Similar to the ejector, a low pressure region may be created within the aspirator so that air can be drawn from a vacuum reservoir or may directly act on a device requiring vacuum, thereby reducing pressure within the vacuum reservoir or device requiring vacuum. There is a continuing need in the art for improved ejectors and aspirators that generate increased vacuum pressure and increased suction mass flow rate while decreasing the consumption of engine air.

SUMMARY

In one aspect, a pneumatically actuated vacuum pump is disclosed, and may be used as either an ejector or an aspirator. The pneumatically actuated vacuum pump includes a body defining a converging motive section, a diverging discharge section, at least one suction port, and a Venturi gap. The Venturi gap is located between an outlet end of the converging motive section and an inlet end of the diverging discharge section. The pneumatically actuated vacuum pump also includes a first check valve fluidly connected to the Venturi gap and the suction port. The pneumatically actuated vacuum pump further includes at least one second gap located in the diverging discharge section of the body downstream of the Venturi gap. A second check valve is fluidly connected to the second gap.

In one embodiment, the pneumatically actuated check valve is an ejector used in an exhaust driven turbocharging system including a boosted engine. The exhaust driven turbocharging system includes a device requiring vacuum, a turbocharger having a compressor fluidly connected to an intake manifold of an engine, and the ejector. The ejector may include a body defining a converging motive section, a diverging discharge section, at least one suction port, and a Venturi gap located between an outlet end of the converging motive section and an inlet end of the diverging discharge section. The converging motive section of the ejector is fluidly connected to the compressor, and the suction port is fluidly connected to the device requiring vacuum. The ejector also includes a first check valve fluidly connected to the Venturi gap and the suction port. The ejector further includes at least one second gap located in the diverging discharge section of the body and downstream of the Venturi gap. A second check valve is fluidly connected to the second gap.

In another embodiment, the pneumatically actuated check valve is an aspirator used in a system including a normally actuated engine. The system includes a device requiring vacuum, an intake manifold of the engine, and the aspirator. The aspirator includes a body defining a converging motive section, a diverging discharge section, at least one suction port, and a Venturi gap located between an outlet end of the converging motive section and an inlet end of the diverging discharge section. The diverging discharge section of the aspirator is fluidly connected to the intake manifold of the engine and the suction port is fluidly connected to the device requiring vacuum. The aspirator includes a first check valve fluidly connected to the Venturi gap and the suction port. The aspirator further includes at least one second gap located in the diverging discharge section of the body and downstream of the Venturi gap. A second check valve is fluidly connected to the second gap.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5A is a front view of the ejector shown in FIG. 1.

FIG. 8 is a table summarizing the operating conditions illustrated in FIGS. 6-7.

FIG. 9 is an illustration of the ejector shown in FIG. 1 during a second set of operating conditions, where shading shows areas of varying pressure.

FIG. 10 is an illustration of the ejector shown in FIG. 2 during the second set of operating conditions, where shading shows areas of varying fluid velocity.

FIG. 11 is a table summarizing the operating conditions illustrated in FIGS. 9-10.

FIG. 13 is an illustration of the aspirator shown in FIG. 12 during a first set of operating conditions, where shading shows areas of varying pressure.

FIG. 14 is an illustration of the aspirator shown in FIG. 12 during the first set of operating conditions, where shading shows areas of varying fluid velocity.

FIG. 15 is a table summarizing the operating conditions illustrated in FIGS. 13-14.

FIG. 16 is an illustration of the aspirator shown in FIG. 12 during a second set of operating conditions, where shading shows areas of varying pressure.

FIG. 17 is an illustration of the aspirator shown in FIG. 12 during the second set of operating conditions, where shading shows areas of varying fluid velocity.

FIG. 18 is a table summarizing the operating conditions illustrated in FIGS. 16-17.

FIG. 21 is a table summarizing the operating conditions illustrated in FIGS. 19-20.

DETAILED DESCRIPTION

Figure 1:
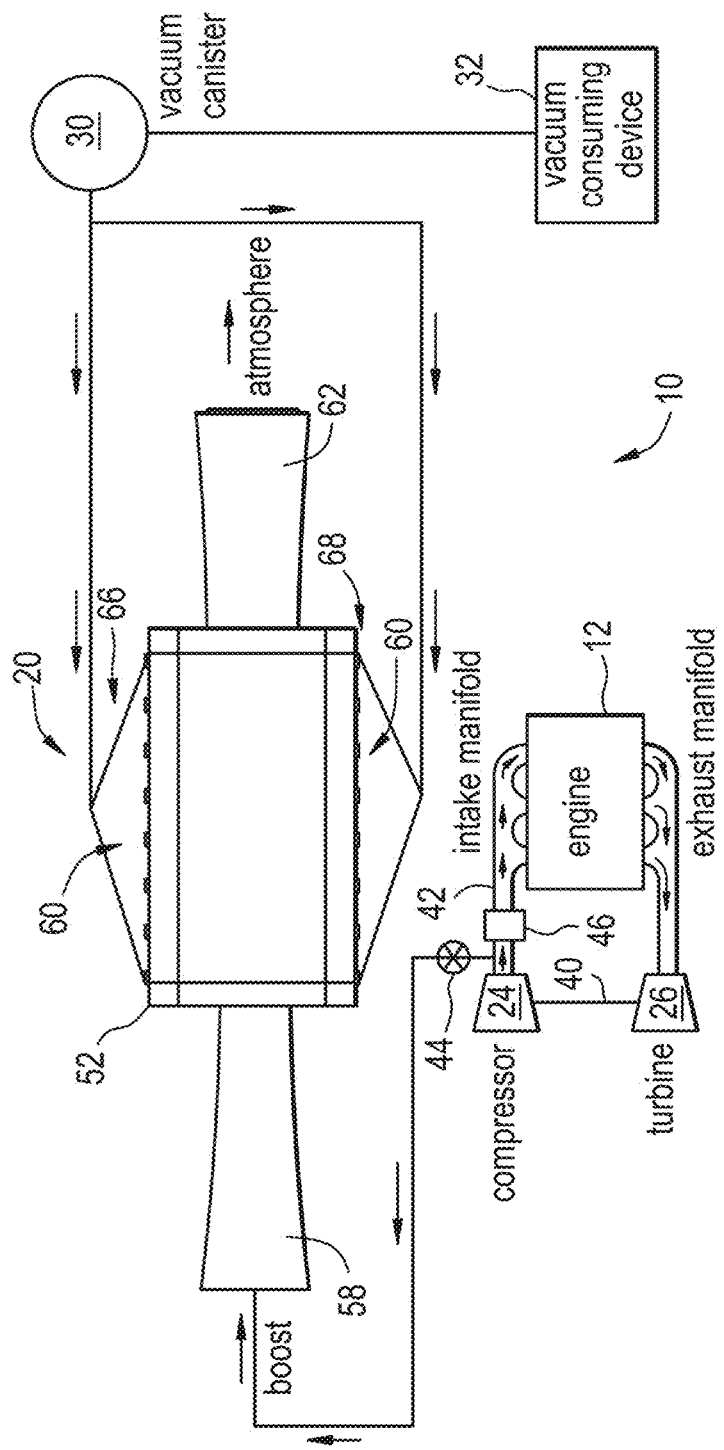
FIG. 1 is a diagram including flow paths and flow directions of one embodiment of an internal combustion engine turbo system including an ejector.

The following detailed description will illustrate the general principles of the invention, examples of which are additionally illustrated in the accompanying drawings. In the drawings, like reference numbers indicate identical or functionally similar elements. As used herein, the term fluid may include any liquid, suspension, colloid, gas, plasma, or combinations thereof.

Referring now to FIG. 1, an exemplary system 10 for providing vacuum to a vehicle vacuum system is disclosed. The system 10 may include an internal combustion engine 12, a pneumatically actuated vacuum pump 20, a compressor 24, a turbine 26, a vacuum reservoir or canister 30, and a vacuum consuming device 32. The internal combustion engine 12 may be, for example, a spark ignited (SI) engine, a compression ignition (CI) engine, or a natural gas engine. In one embodiment, the internal combustion engine 12 may be included in an electric motor/battery system that is part of a hybrid vehicle. The compressor 24 and turbine 26 may be part of a turbocharger for improving the power output and overall efficiency of the internal combustion engine 12. The turbine 26 may include a turbine wheel (not shown) that harnesses and converts exhaust energy into mechanical work through a common shaft 40 to turn a compressor wheel (not shown) of the compressor 24. The compressor wheel ingests, compresses, and feeds air at elevated operating pressures into an intake manifold 42 of the internal combustion engine 12.

The vacuum canister 30 may be supplied vacuum from the intake manifold 42 of the internal combustion engine 12 via the pneumatically actuated vacuum pump 20. A pressure regulator 44 is controllable to be selectively opened to permit compressed air, at pressures higher than atmospheric pressure, (boost pressure) from the compressor 24 to pass through the pneumatically actuated vacuum pump 20. The compressed air passes through the pneumatically actuated vacuum pump 20 to create a low pressure region within pneumatically actuated vacuum pump 20, thereby providing a vacuum source for the vacuum canister 30. In an alternative embodiment, the pneumatically actuated vacuum pump 20 may directly supply vacuum to the vacuum consuming device 32. The vacuum consuming device 32 may be a device requiring vacuum, such as a brake booster. In an embodiment, the vacuum consuming device 32 may also include additional vacuum consumers as well such as, for example, turbocharger waste gate actuators, heating and ventilation actuators, driveline actuators (e.g., four wheel drive actuators), fuel vapor purging systems, engine crankcase ventilation, and fuel system leak testing systems.

The compressed air flowing through the pneumatically actuated vacuum pump 20 may be discharged to any portion of the system 10 that is at conditions the same or generally similar to atmospheric or a pressure lower than boost pressure(s). In the non-limiting embodiment as shown in FIG. 1, the pneumatically actuated vacuum pump 20 may discharge the compressed air to the atmosphere. In an alternative embodiment, the compressed air flowing through the pneumatically actuated vacuum pump 20 may be returned to the intake manifold 42 at a location downstream of the compressor 24. In another embodiment, an optional throttle 46 may be included downstream of the compressor 24. The compressed air flowing through the pneumatically actuated vacuum pump 20 may be returned to the intake manifold 42 at a location downstream of both the compressor 24 and throttle 46.

Figure 12:
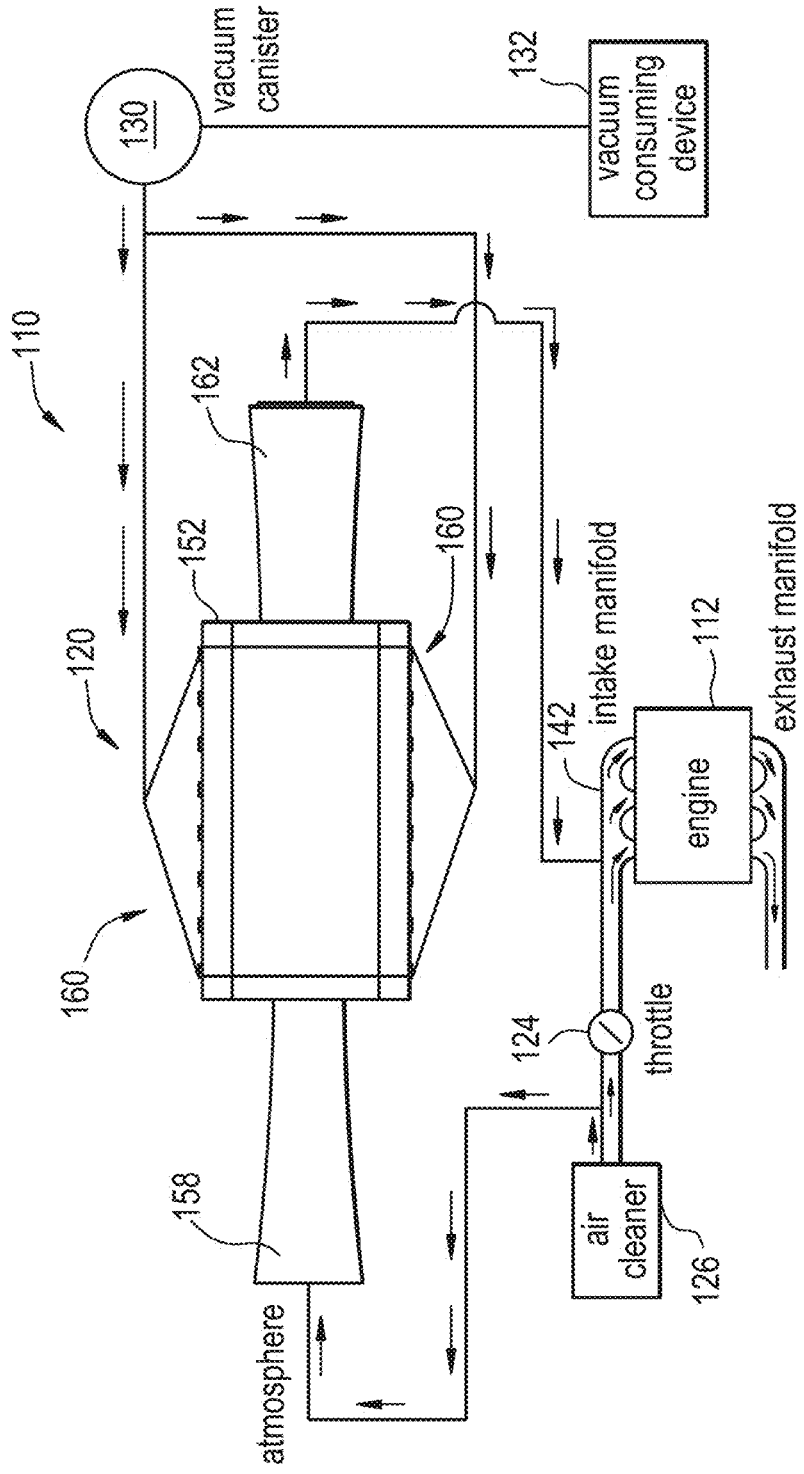
FIG. 12 is a diagram including flow paths and flow directions of another embodiment of an internal combustion engine system including an aspirator.

In the embodiments as shown in FIGS. 1-11, the pneumatically actuated vacuum pump 20 is an ejector 52. That is, the pneumatically actuated vacuum pump 20 is connected to a pressure source above atmospheric pressure (e.g., boost pressure from the compressor 42) and discharges air to any portion of the system 10 lower than boost pressure. However, it is to be understood that in an alternative embodiment the pneumatically actuated vacuum pump 20 may be used as an aspirator in a system that may not include a boosted engine (i.e. no turbocharger). In other words, the aspirator may be used in a system employing a normally aspirated internal combustion engine, where air intake depends solely on atmospheric pressure. This configuration is illustrated in FIG. 12, and is described in greater detail below.

Figure 2:
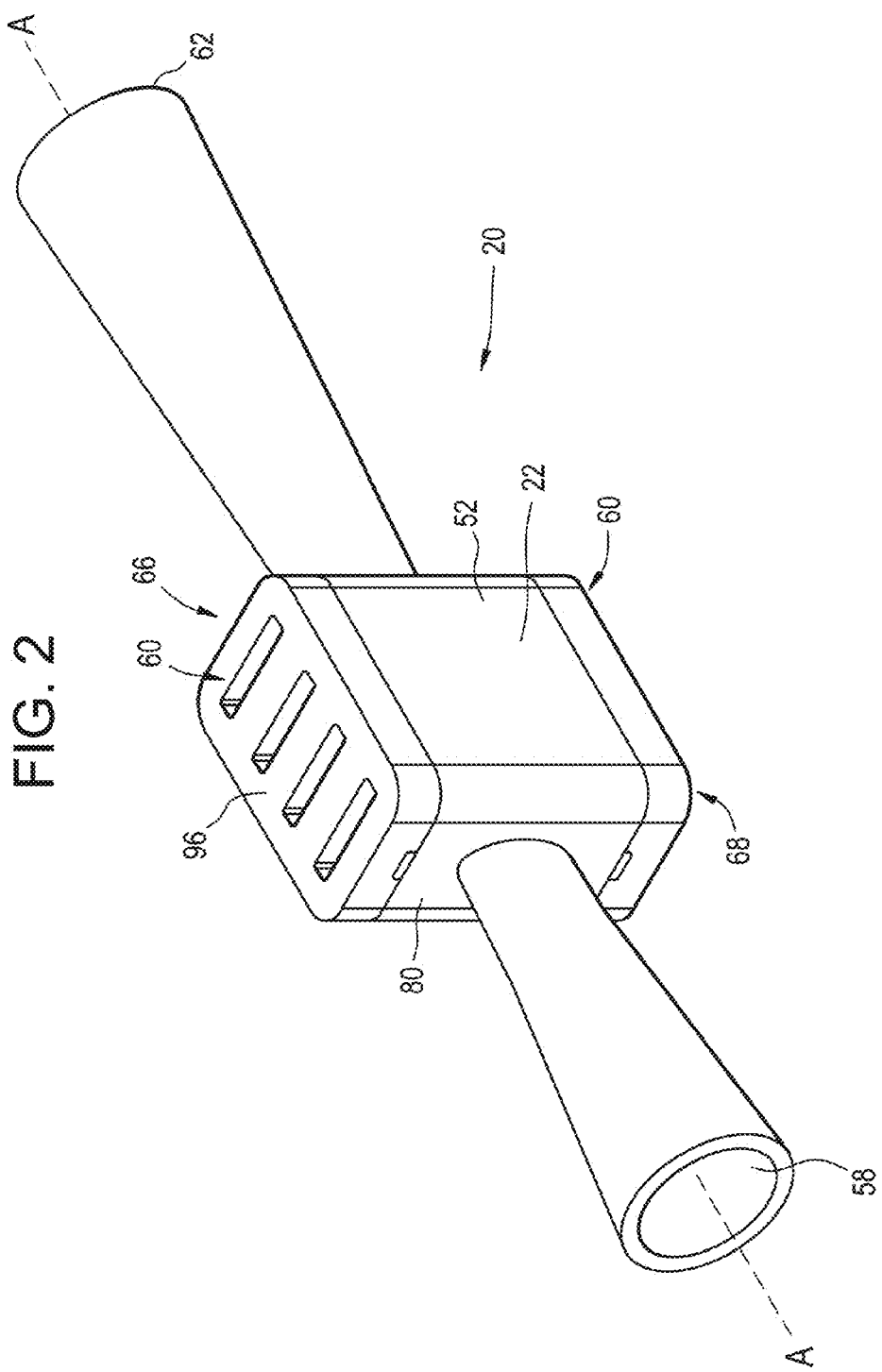
FIG. 2 is a perspective view of the ejector shown in FIG. 1.
Figure 3:
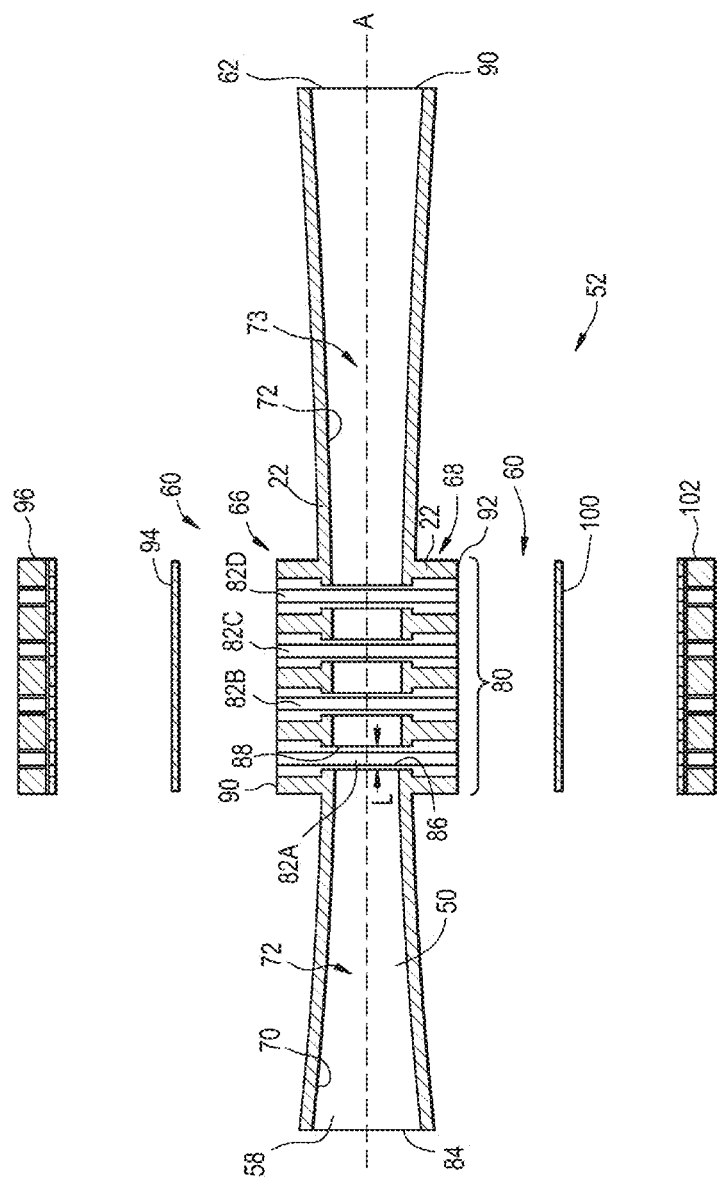
FIG. 3 is an exploded front view of the ejector shown in FIG. 1.

Referring to FIGS. 2-3, a body 22 of the ejector 52 may define a passageway 50 (shown in FIG. 3) that extends along an axis A-A. In the embodiment as illustrated, the body 22 of the ejector 52 includes four ports that are connectable to subsystems of the internal combustion engine 12 (FIG. 1). Specifically, referring to FIGS. 1-3, the ejector 52 may include a motive port 58 which is fluidly connected to and supplies compressed air from the compressor 42, two suction ports 60 fluidly connected to the vacuum canister 30, and a discharge port 62 which is fluidly connected to and discharges air to either the atmosphere or a pressure lower than boost pressure. In the non-limiting embodiment as shown, the ejector 52 includes two suction ports 60, where one of the suction ports 60 is located along a top portion 66 of the ejector 52 and the remaining suction port 60 is located along a bottom portion 68 of the ejector 52. However, it is to be understood that in another embodiment only one suction port 60 located along either the top portion 66 or the bottom portion 68 of the ejector 52 may be used as well.

Referring to FIG. 3, the passageway 50 of the ejector 52 may include a first tapering portion 72 (also referred to as a motive cone) in a motive section 70 of the passageway 50. The passageway 50 may also include a second tapering portion 73 (also referred to as a discharge cone) in a discharge section 72 of the passageway 50. The first tapering portion 72 of the passageway 50 may include an inlet end 84 and an outlet end 86. Similarly, the second tapering portion 73 of the passageway 50 may also include an inlet end 88 and an outlet end 90.

As seen in FIG. 3, the first tapering portion 72 of the ejector 52 may be fluidly coupled to the second tapering portion 73 by a Venturi gap 82A. The Venturi gap 82A may be a fluid junction that places the suction ports 60 in fluid communication with the motive section 70 and the discharge section 72 of the ejector 52. In particular, the Venturi gap 82A may be the lineal distance L measured between the outlet end 86 of the first tapering portion 72 and the inlet end 88 of the second tapering portion 73.

The inlet ends 84, 88 and the outlet ends 86, 90 of the passageway 50 of the ejector 52 may include any type of profile, such as, but not limited to, a circular shape, an ellipse shape, or another polygonal form. Moreover, the gradually, continuously tapering inner diameter extending from inlet ends 84, 88 and the outlet ends 86, 90 of the passageway 50 may define a hyperboloid or a cone. Some exemplary configurations for the outlet end 86 of the first tapering portion 72 and the inlet end 88 of the second tapering portion 73 are presented in FIGS. 4-6 of co-pending U.S. patent application Ser. No. 14/294,727, filed on Jun. 3, 2014, which is incorporated by reference herein in its entirety.

A plurality of additional gaps 82B, 82C, 82D may be located downstream of the Venturi gap 82A, along the second tapering portion 73 of the ejector 52. In the embodiment, as shown in the figures, the ejector 52 includes a total of four gaps, where three gaps 82B, 82C, 82D are located downstream of the Venturi gap 82A. It is to be understood that this illustration is merely one exemplary embodiment of the ejector 52. Those skilled in the art will readily appreciate that any number of gaps may be located downstream of the Venturi gap 82A. The body 22 of the ejector 52 may define a housing 80. The housing 80 may surround a portion of the second tapering portion 73 of the ejector 52, and contain the gaps 82A, 82B, 82C, 82D therein. In the embodiment as illustrated, the housing 80 may include a generally rectangular profile, however the housing 80 is not limited to a rectangular profile.

Figure 5B:
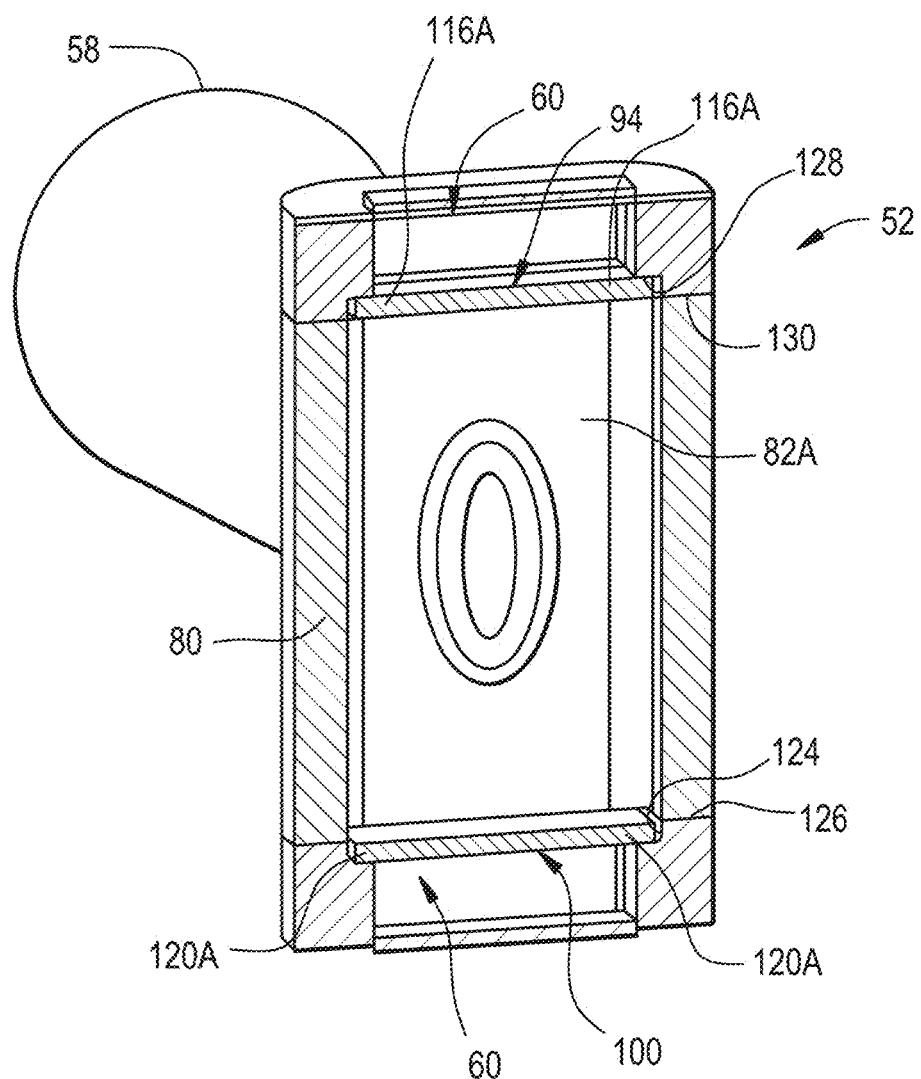
FIG. 5B is a view of the ejector shown in FIG. 1 taken along section lines B-B, where a check valve of a Venturi gap of the ejector is closed.
Figure 5C:
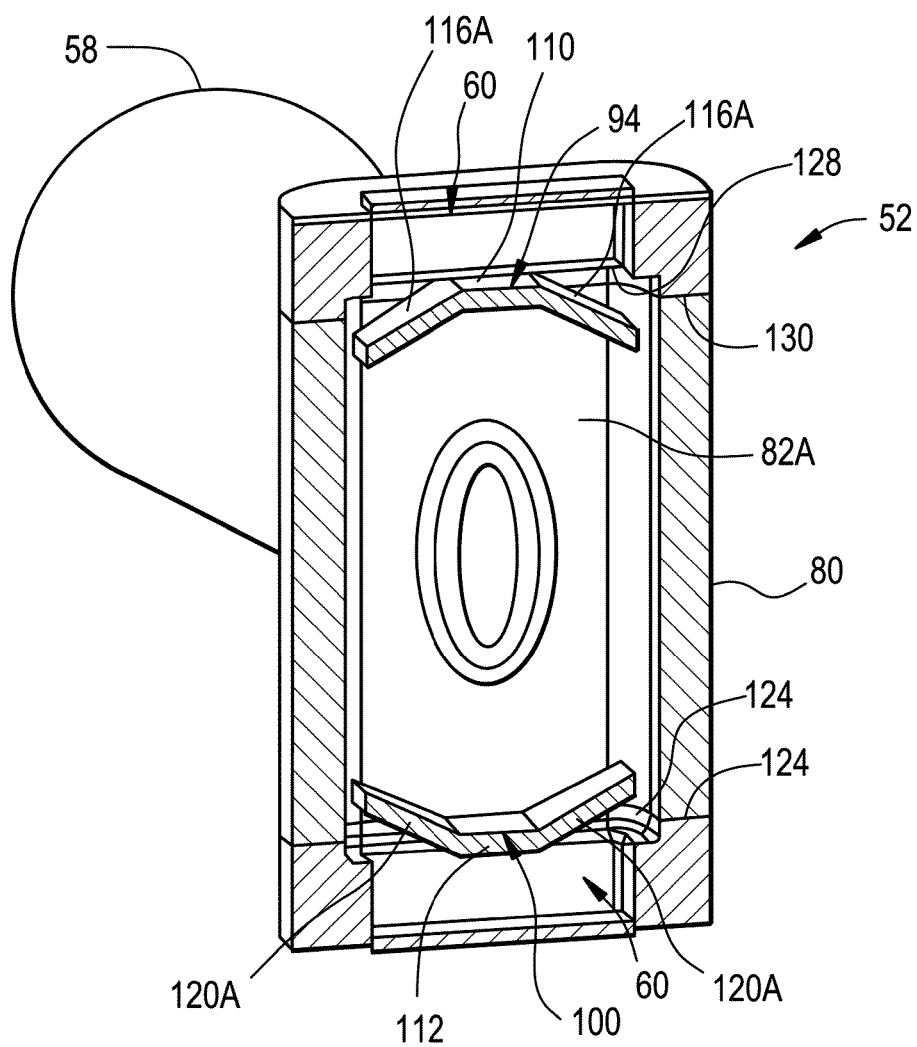
FIG. 5C is a view of the ejector shown in FIG. 1 taken along section lines B-B, where a check valve of a Venturi gap of the ejector is open.

Each gap 82A, 82B, 82C, 82D may be a void located within the housing 80. Specifically, gaps 82A, 82B, 82C, 82D may each be similar to an interior cross-section of the housing 80. For example, as seen in FIGS. 5B-5C, the gap 82A may include a generally rectangular profile that substantially corresponds with the interior cross-section of the housing 80. Turning back to FIG. 3, the flow of motive air through the first tapering portion 72 of the ejector 52 may increase in speed, but creates low static pressure. This low static pressure draws air from the suction ports 60 into the Venturi gap 82A. The remaining gaps 82B, 82C, 82D located downstream of the Venturi gap 82A may also be used to further draw in air from the suction ports 60 as well, which is described in greater detail below.

Figure 4:
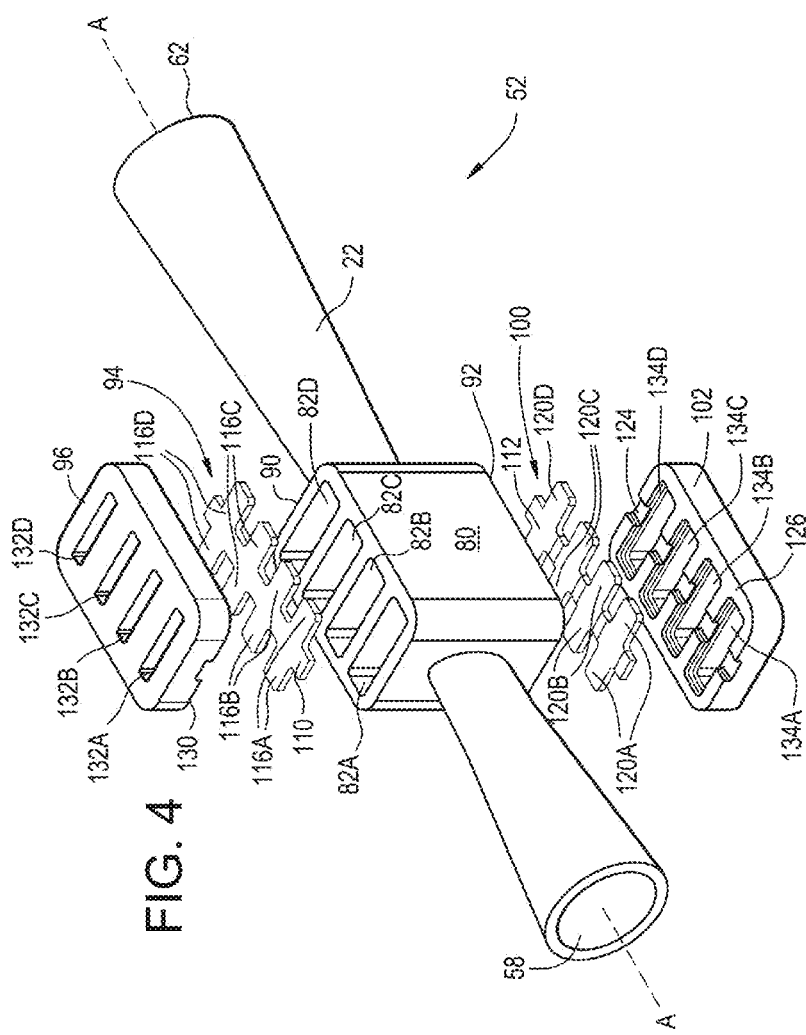
FIG. 4 is an exploded perspective view of the ejector shown in FIG. 1.

Referring to FIGS. 3-4, the housing 80 may include a top surface 90 and a bottom surface 92. An upper check valve element 94 and an upper suction cap 96 may be positioned against the top surface 90, and a lower check valve element 100 and a lower suction cap 102 may be positioned against the bottom surface 92 when the ejector 52 is assembled (shown in FIG. 2). Although both the upper check valve element 94 and the lower check valve element 100 are illustrated, it is to be understood in another embodiment the housing 80 may only include either the upper check valve element 94 or the lower check valve element 100. Specifically, the upper check valve element 94 may be positioned between the upper suction cap 96 and the top surface 90 of the housing 80, and the lower check valve element 100 may be positioned between the lower suction cap 102 and the bottom surface 92 of the housing 80. In one embodiment, the upper suction cap 96 and the lower suction cap 102 may each include a barb (not illustrated) for mating with a hose (not illustrated) that connects the suction ports 60 to the vacuum canister 30 (FIG. 1).

The upper check valve element 94 and the lower check valve element 100 may be constructed of a relatively flexible material such as, for example, an elastomer. The flexible material enables the upper check valve element 94 and the lower check valve element 100 to bend or deform during operation of the ejector 52, which is illustrated in FIGS. 5B-5C and described in greater detail below. Turning now to FIG. 4, the upper check valve element 94 may include a first section 110 and the lower check valve element 100 may include a first section 112. The first sections 110, 112 of the upper check valve element 94 and the lower check valve element 100 are each substantially parallel with the axis A-A of the ejector 52. A plurality of outwardly projecting fingers or tabs 116A, 116B, 116C, 116D may extend outwardly and in a direction generally transverse with respect to the first section 110 of the upper check valve element 94. Similarly, a plurality of outwardly projecting fingers or tabs 120A, 120B, 120C, 120D extend in a direction generally transverse with respect to the first section 112 of the lower check valve element 100.

Each of the tabs 116A, 116B, 116C, 116D of the upper check valve element 94 may correspond to and is fluidly connected to one of the gaps 82A, 82B, 82C, 82D. Similarly, each of the tabs 120A, 120B, 120C, 120D of the lower check valve element 100 may also correspond to and is fluidly connected to one of the gaps 82A, 82B, 82C, 82D. As seen in FIG. 4, a recess 124 may be located along an upper surface 126 the lower suction cap 102. The recess 124 may include a profile that generally corresponds with the lower check valve element 100. Thus, the lower check valve element 100 may be seated within the recess 124 of the lower suction cap 102. It is understood that a similar recess 128 (visible in FIGS. 5B-5C) may also be located along a lower surface 130 of the upper suction cap 96 as well, and includes a profile that generally corresponds with the upper check valve element 94.

The upper suction cap 96 may include a plurality of apertures 132A, 132B, 132C, 132D that correspond to one of the tabs 116A, 116B, 116C, 116D of the upper check valve element 94. Each aperture 132A, 132B, 132C 132D may be used to fluidly connect a corresponding one of the gaps 82A, 82B, 82C, 82D with the upper suction port 60 of the ejector 52, as well as the vacuum canister 30 (FIG. 1). Similarly, the lower suction cap 102 may include a plurality of apertures 134A, 134B, 134C, 134D that correspond to one of the tabs 120A, 120B, 120C, 120D of the lower check valve element 100. Each aperture 134A, 134B, 134C, 134D may be used to fluidly connect a corresponding one of the gaps 82A, 82B, 82C, 82D with the lower suction port 60 of the ejector 52, as well as the vacuum canister 30 (FIG. 1).

FIG. 5A is a front view of the ejector 52 and FIGS. 5B-5C are perspective views of the ejector 52 taken along section line B-B in FIG. 5A. Specifically, section line B-B is taken at gap 82A. Thus, FIGS. 5B and 5C both illustrate the tab 116A of the upper check valve element 94, as well as the tab 120A of the lower check valve element 100. FIG. 5B is an illustration of the tabs 116A and 120A in a closed position, and FIG. 5C is an illustration of the tabs 116A and 120A in an open position.

Referring specifically to FIG. 5B, when pressure located in the upper suction port 60 of the ejector 52 is equal to or less than pressure in the Venturi gap 82A, the upper check valve element 94 may be seated flush within the upper suction cap 96, and the tabs 116A are not bent. Similarly, when pressure located in the lower suction port 60 (FIG. 1) of the ejector 52 is equal to or less than pressure in the Venturi gap 82A, the lower check valve element 100 may be seated flush within the lower suction cap 102, and the tabs 120A are not bent. When the check valves 94, 100 are in the closed position, air from the upper and lower suction ports 60 (FIG. 1) of the ejector 52 may not be suctioned into the Venturi gap 82A.

Turning now to FIG. 5C, when the pressure located in the upper suction port 60 of the ejector 52 is greater than the pressure in the Venturi gap 82A, the upper check valve element 94 may open. Specifically, the upper check valve 94 is flexible enough such that the tabs 116A may bend inwardly along the first portion 110 and towards the Venturi gap 82A, thereby allowing air from the upper suction port 60 to be suctioned into the Venturi gap 82A. Similarly, when the pressure located in the lower suction port 60 of the ejector 52 is greater than the pressure in the Venturi gap 82A, the lower check valve element 100 may open. Specifically, the lower check valve 100 is flexible enough such that the tabs 120A may bend inwardly along the first portion 112 and towards the Venturi gap 82A, thereby allowing air from the lower suction port 60 to be suctioned into the Venturi gap 82A.

Those skilled in the art will readily appreciate that while FIGS. 5B-5C only illustrate the check valves corresponding to the Venturi gap 82A, the remaining gaps 82B, 82C, and 82D operate in a similar fashion. It is also to be understood that each of the tabs 116A, 116B, 116C, 116D of the upper check valve element 94 may bend independently of one another. Similarly, each of the tabs 120A, 120B, 120C, 120D of the lower check valve element 100 may bend independently of one another. Thus, during operation of the ejector 52, only a portion of the gaps 82A, 82B, 82C, 82D may have their corresponding check valves open in order to allow air to be sucked out of the vacuum canister 30 (FIG. 1), while the remaining gaps 82A, 82B, 82C, 82D may have their corresponding check valves closed.

Figure 6:
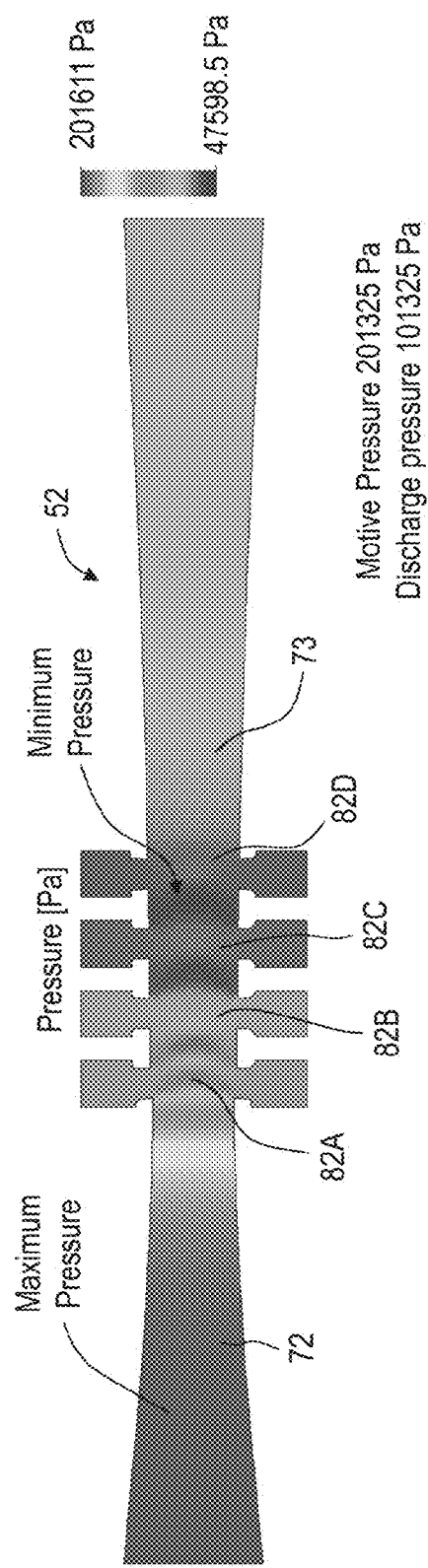
FIG. 6 is an illustration of the ejector shown in FIG. 1 during a first set of operating conditions, where shading shows areas of varying pressure.
Figure 7:
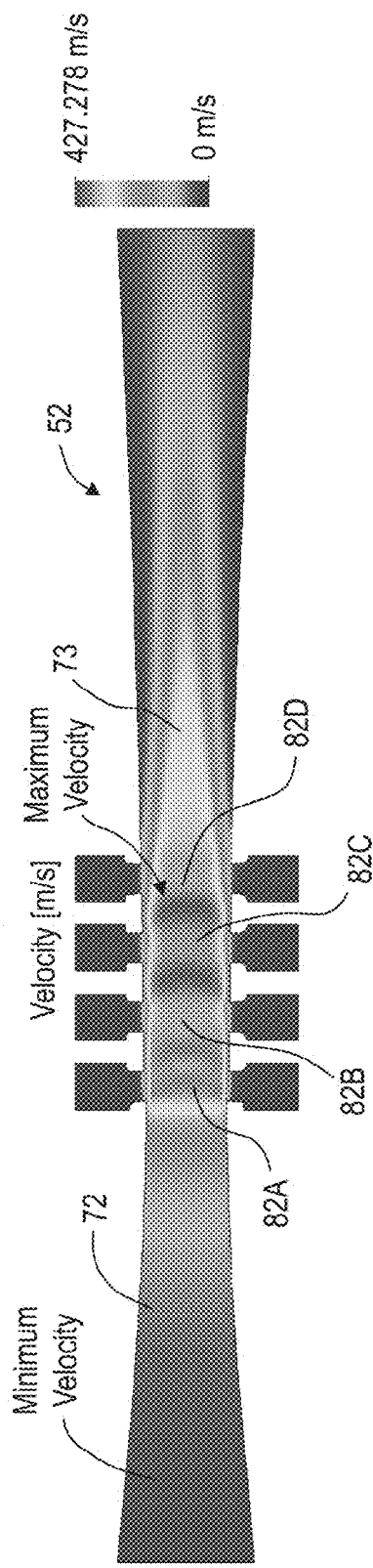
FIG. 7 is an illustration of the ejector shown in FIG. 5 during the first set of operating conditions, where shading shows areas of varying fluid velocity.

FIGS. 6-7 are an illustration of the ejector 52 during a first set of exemplary operating conditions. Specifically, FIG. 6 illustrates the pressure profile and FIG. 7 illustrates a corresponding velocity profile during the exemplary operating conditions. In the embodiment as shown in FIGS. 6-7, the maximum pressure located within the ejector 52 is located in the first tapering portion 72, while the minimum pressure within the ejector 52 is located in the second tapering portion 73. In particular, the minimum pressure within the ejector 52 is in the second tapering portion 73 between the third gap 82C and the fourth gap 82D.

Continuing to refer to both FIGS. 6-7, the ejector 52 may include a location of maximum velocity. The location of maximum velocity is the same as the location of minimum pressure within the ejector 52. Thus, referring to FIG. 7, the location of maximum velocity within the ejector 52 is in the second tapering portion 73 between the third gap 82C and the fourth gap 82D.

FIG. 8 summarizes the operating conditions of the ejector 52 illustrated in FIGS. 6-7. In the embodiment as shown, the motive pressure of the ejector 52 is approximately 201,325 Pascal, and the discharge pressure of the ejector 52 is approximately 101,325 Pascal. The pressure in the vacuum canister 30 (FIG. 1) may range from approximately 100,000 Pascal to approximately 65,420 Pascal. Specifically, the ejector 52 may be used to suck air out of the vacuum canister 30 at 100,000 Pascal until the vacuum canister 30 reaches an internal pressure of about 65,420 Pascal. FIGS. 6-7 illustrates the pressure and velocity profiles of the ejector 52 when the vacuum canister 30 is at a minimum pressure of approximately 65,420 Pascal.

FIG. 8 also illustrates the pressure at which the gaps 82A-82D may close at (i.e., the corresponding check valve elements 94, 100 are in the closed position as seen in FIG. 5B and no longer allow air to be sucked out of the vacuum canister 30). For example, referring to FIGS. 2 and 6-8, the gap 82B continues to suck air from the vacuum canister 30 until the pressure within the gap 82B reaches 80,155 Pascal. Then, the check valve tab 116B closes. The Venturi gap 82A continues to suck air from the vacuum canister 30 until the Venturi gap 82A reaches 77,935 Pascal. Then the check valve tab 116A closes. The gap 82C continues to suck air out from the vacuum canister 30 until the gap 82C reaches 67,841 Pascal. Then the check valve tab 116C closes. Eventually the check valve tab 116D closes once the vacuum canister 30 reaches 65,420 Pascal.

FIGS. 9-10 are an illustration of the ejector 52 during a different set of exemplary operating conditions. Specifically, FIG. 9 illustrates the pressure profile and FIG. 10 illustrates a corresponding velocity profile during the exemplary operating conditions. FIG. 11 summarizes the operating conditions of the ejector 52 illustrated in FIGS. 9-10. In the embodiment as shown, the motive pressure of the ejector 52 is approximately 241,325 Pascal, and the discharge pressure of the ejector 52 is approximately 101,325 Pascal. The pressure in the vacuum canister 30 (FIG. 1) may range from approximately 100,000 Pascal to approximately 57,440 Pascal.

In the embodiment as shown in FIGS. 9-11, the minimum pressure within the ejector 52 has shifted downstream within the second tapering portion 73 when compared to the ejector 52 illustrated in FIGS. 6-7. Specifically, the minimum pressure within the ejector 52 is now located downstream of the fourth gap 82D. Those skilled in the art will readily appreciate that as the motive pressure of the ejector 52 increases, the location of the minimum pressure within the ejector 52 may shift or move downstream within the second tapering portion 73. For example, referring generally to FIGS. 6-7 and 9-10, the motive pressure has increased from approximately 201,325 Pascal (seen in FIGS. 6-7) to approximately 241,325 Pascal (seen in FIGS. 9-10). Accordingly, the minimum pressure located within the ejector 52 has also shifted downstream within the second tapering portion 73 of the ejector 52 as well.

It should be understood that positioning one or more gaps (e.g., the gaps 82B, 82C, 82D) downstream of the Venturi gap 82A takes advantage of the minimum pressure shifting downstream within the second tapering portion 73 of the ejector 52. Specifically, as the motive pressure into the ejector 52 increases, the gaps 82B, 82C, 82D and their corresponding check valves (shown in FIGS. 3 and 5B-5C) may continue to suction air out of the vacuum canister 30, even as the minimum pressure within the ejector 52 shifts downstream within second tapering portion 73 of the ejector 52. In other words, as the location of minimum pressure within the ejector 52 shifts downstream, the gaps 82B, 82C, 82D may be used to further suction air out of the vacuum canister 30. Thus, the ejector 52 may be used to suction air, even as the motive pressure at the motive port 58 increases. In contrast, current ejectors cannot produce a suction below atmospheric pressure when the motive pressure exceeds about 192,000 Pascal, and the maximum vacuum is produced with a motive pressure less than about 135,000 Pascal.

FIG. 12 is an alternative embodiment illustrating a system 110 for providing vacuum to a vehicle vacuum system. The system 110 may include an internal combustion engine 112, a pneumatically actuated vacuum pump 120, a throttle 124, an air cleaner 126, a vacuum canister 130, and a vacuum consuming device 132. The throttle 124 may be located downstream of the air cleaner 126 and upstream of an intake manifold 142 of the internal combustion engine 112. Unlike the embodiment as shown in FIG. 1, the internal combustion engine 112 is normally aspirated and not boosted (i.e., no turbo charger is included).

The vacuum canister 130 may be supplied vacuum from the intake manifold 142 of the internal combustion engine 112. Additionally, the vacuum canister 130 may also be supplied vacuum from the atmosphere via the air cleaner 126 and the pneumatically actuated vacuum pump 120. The pneumatically actuated vacuum pump 120 is supplied clean air from the air cleaner 126, upstream of the throttle 124. The clean air passes through the pneumatically actuated vacuum pump 120 and creates a low pressure region, thereby providing a vacuum source for the vacuum canister 130. In an alternative embodiment, the pneumatically actuated vacuum pump 120 may directly supply vacuum to the vacuum consuming device 132. The air flowing through the pneumatically actuated vacuum pump 120 may be discharged to the intake manifold 42 at a location downstream of a throttle 146.

The pneumatically actuated vacuum pump 120 shown in FIG. 12 includes the same internal structure as the pneumatically actuated vacuum pump 20 described above and shown in FIGS. 2-11. However, the pneumatically actuated vacuum pump 120 works as an aspirator 152 within the system 110. This means that the pneumatically actuated vacuum pump 120 includes a motive port 158 that is supplied clean air at atmosphere, one or more suction ports 160 that connect to the vacuum canister 130, and a discharge port 162 that is connected to the engine intake manifold 142 downstream of the throttle 146. Moreover, unlike the ejector 52 as illustrated in FIGS. 1-11, the motive pressure of the aspirator 152 is typically at atmosphere (about 101,325 Pascal). In other words, the motive pressure of the aspirator 152 does not substantially vary and is typically at atmosphere. Instead, the discharge pressure may change as a function of the pressure within the intake manifold 142.

FIGS. 13-14 are an illustration of the injector 152 during exemplary operating conditions. Specifically, FIG. 13 illustrates the pressure profile and FIG. 14 illustrates a corresponding velocity profile during the exemplary operating conditions. In the embodiment as shown in FIGS. 13-14, the pressure of the aspirator 152 at the motive port 158 is about atmosphere (101,325 Pascal), and the pressure of the aspirator 152 at the discharge port 162 is at about 41,325 Pascal. The minimum pressure located within the aspirator 152 is located in a second tapering portion 173. In particular, the minimum pressure within the aspirator 152 is in the second tapering portion 173 at a Venturi gap 182A.

Continuing to refer to both FIGS. 13-14, the aspirator 152 may include a location of maximum velocity. The location of maximum velocity is the same as the location of minimum pressure within the aspirator 152. Thus, referring to FIG. 14, the location of maximum velocity within the aspirator 152 is in the second tapering portion 173 at Venturi gap 182A. FIG. 15 summarizes the operating conditions of the aspirator 152 illustrated in FIGS. 13-14. The pressure in the vacuum canister 30 (FIG. 1) may range from approximately 100,000 Pascal to approximately 58,900 Pascal. Specifically, the aspirator 152 may be used to suck air out of the vacuum canister 30 at 100,000 Pascal until the vacuum canister 30 reaches an internal pressure of about 58,900 Pascal. FIGS. 13-14 illustrates the pressure and velocity profiles of the aspirator 152 when the vacuum canister 30 is at a minimum pressure of approximately 58,900 Pascal.

FIGS. 16-17 are an illustration of the aspirator 152 during a second set of exemplary operating conditions. Specifically, the pressure of the aspirator 152 at the discharge port 162 has decreased to about 61,325 Pascal. FIG. 18 summarizes the operating conditions of the aspirator 152 illustrated in FIGS. 16-17. The pressure in the vacuum canister 30 (FIG. 1) may range from approximately 100,000 Pascal to approximately 39,900 Pascal. In the embodiment as shown in FIGS. 16-18, the minimum pressure within the aspirator 152 has shifted downstream within the second tapering portion 173 when compared to the aspirator 152 illustrated in FIGS. 13-15. Specifically, the minimum pressure within the aspirator 152 is now located between the Venturi gap 182A and the gap 182B. Moreover, as the pressure of the aspirator 152 at the discharge port 162 decreases, the amount of vacuum the aspirator 152 produces may increase. In other words, the amount of air the aspirator 152 may suction out of the vacuum canister 30 (FIG. 1) increases.

Figure 19:
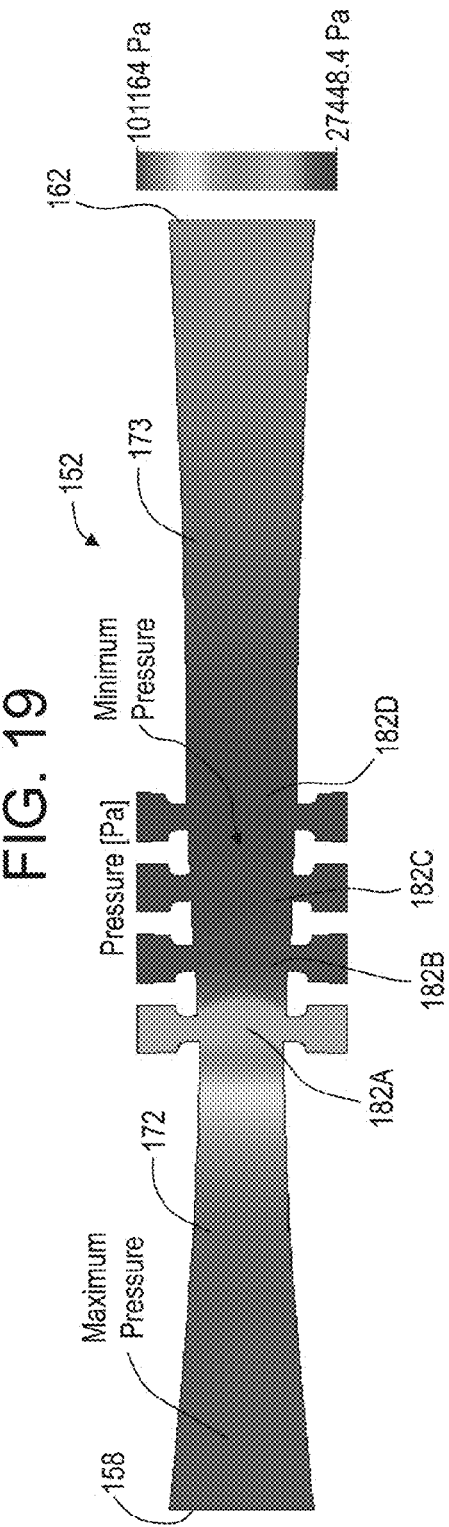
FIG. 19 is an illustration of the aspirator shown in FIG. 12 during a third set of operating conditions, where shading shows areas of varying pressure.
Figure 20:
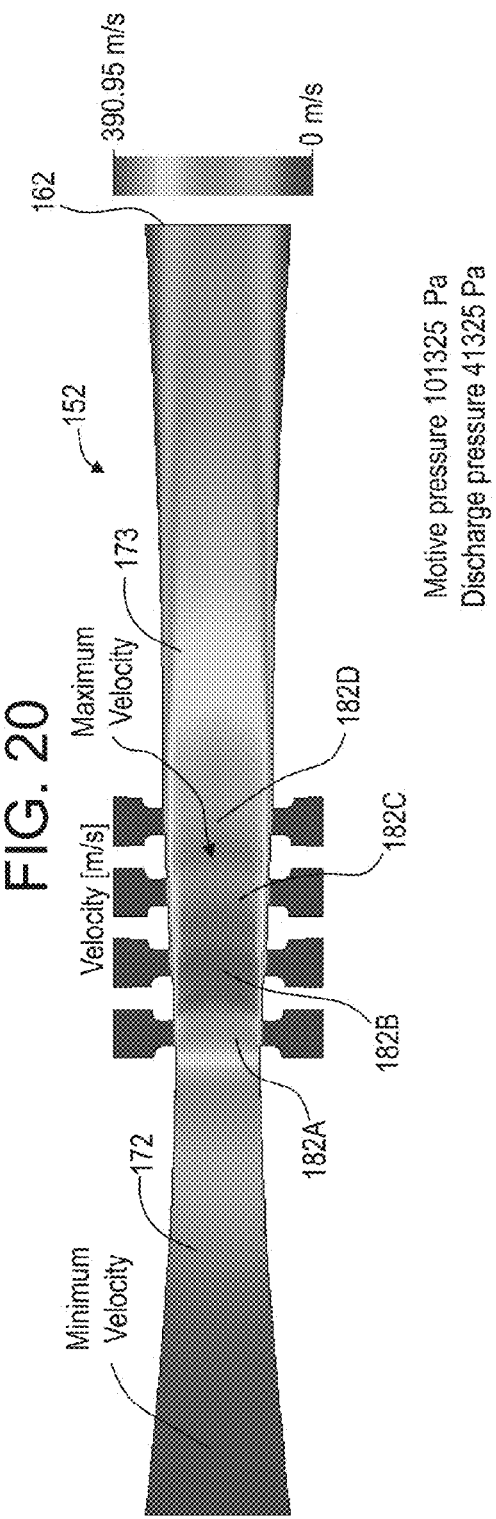
FIG. 20 is an illustration of the aspirator shown in FIG. 12 during the third set of operating conditions, where shading shows areas of varying fluid velocity.

FIGS. 19-20 are an illustration of the aspirator 152 during a third set of exemplary operating conditions. Specifically, the pressure of the aspirator 152 at the discharge port 162 has decreased to about 41,325 Pascal. FIG. 21 summarizes the operating conditions of the aspirator 152 illustrated in FIGS. 19-20. The pressure in the vacuum canister 30 (FIG. 1) may range from approximately 100,000 Pascal to approximately 28,400 Pascal. In the embodiment as shown in FIGS. 19-21, the minimum pressure within the aspirator 152 has shifted downstream within the second tapering portion 173 when compared to both sets of operating conditions illustrated in FIGS. 13-15 and FIGS. 16-18. Moreover, it should also be noted that the amount of vacuum the aspirator 152 produces has increased even more from 39,900 Pascal (FIGS. 16-18) to 28,400 Pascal.

Referring generally to FIGS. 13-21, as the pressure of the aspirator 152 at the discharge port 162 decreases from 81,325 Pascal to 41,325 Pascal, the amount of vacuum the aspirator 152 produces may increase. Those skilled in the art will readily appreciate the advantages and benefits of the aspirator 152, as the disclosed aspirator 152 continues to provide suction pressure to the vacuum canister 130 that is lower than the discharge pressure at a variety of operating conditions. Moreover, for any given discharge pressure, if the pressure in the vacuum canister 130 is above the pressure generated by the aspirator 152, then there is a possibility that suction flow may proceed through multiple gaps 182A, 182B, 182C, 182D within the aspirator 152 (i.e., two, three, or even all four of the gaps). This in turn may increase the suction flow rate from the aspirator 152 when compared to conventional aspirators that are currently available. An increased suction flow rate generated by the aspirator 152 may be used to reduce the time required to evacuate the canister 130, and/or to reduce the motive flow that is used to generate suction flow.

The embodiments of this invention shown in the drawings and described above are exemplary of numerous embodiments that may be made within the scope of the appended claims. It is contemplated that numerous other configurations of the disclosure may be created taking advantage of the disclosed approach. In short, it is the applicant's intention that the scope of the patent issuing herefrom will be limited only by the scope of the appended claims.

What is claimed is:

1. A pneumatically actuated vacuum pump for an engine, comprising: a body defining a converging motive section, a diverging discharge section, at least one suction port, a housing defining a surface, and a Venturi gap, wherein the housing surrounds a portion of the diverging discharge section and contains the Venturi gap is located between an outlet end of the converging motive section and an inlet end of the diverging discharge section; a first check valve fluidly connected to the Venturi gap and the suction port; at least one second gap located in the diverging discharge section of the body downstream of the Venturi gap, wherein a second check valve is fluidly connected to the second gap, and wherein the housing contains the second gap; and at least one check valve element and at least one suction cap, wherein the check valve element is located between the suction cap and the surface of the housing.

2. The pneumatically actuated vacuum pump of claim 1, wherein the at least one check valve element includes a first portion and a plurality of tabs that extend in a direction transverse to the first portion.

3. The pneumatically actuated vacuum pump of claim 2, wherein the plurality of tabs each correspond to either the Venturi gap or the second gap.

4. The pneumatically actuated vacuum pump of claim 1, wherein the at least one check valve element is constructed of an elastomer.

5. The pneumatically actuated vacuum pump of claim 1, further comprising an upper check valve element, an upper suction cap, a lower check valve element, and a lower suction cap, wherein the upper check valve element is located between the upper suction cap and an upper surface of the housing and the lower check valve element is located between the lower suction cap and a lower surface of the housing.

6. The pneumatically actuated vacuum pump of claim 1, wherein three additional gaps are located downstream of the Venturi gap.

7. An exhaust driven turbocharging system, comprising: a device requiring vacuum; a turbocharger having a compressor fluidly connected to an intake manifold of an engine; and an ejector, comprising: a body defining a converging motive section, a diverging discharge section, at least one suction port, a housing defining a surface, and a Venturi gap located between an outlet end of the converging motive section and an inlet end of the diverging discharge section, wherein the housing surrounds a portion of the diverging discharge section and contains the Venturi gap, and wherein the converging section of the ejector is fluidly connected to the compressor and the suction port is fluidly connected to the device requiring vacuum; a first check valve fluidly connected to the Venturi gap and the suction port; and at least one second gap located in the diverging discharge section of the body and downstream of the Venturi gap, wherein a second check valve is fluidly connected to the second gap, and wherein the housing contains the second gap; and at least one check valve element and at least one suction cap, wherein the check valve element is located between the suction cap and the surface of the housing.

8. The system of claim 7, wherein the diverging discharge section of the ejector is fluidly connected to atmosphere.

9. The system of claim 7, wherein the diverging discharge section of the ejector is fluidly connected to the intake manifold at a location downstream of the compressor.

10. The system of claim 7, further comprising a throttle located downstream of the compressor, and wherein the diverging discharge section of the ejector is fluidly connected to the intake manifold at a location downstream of the compressor.

11. The system of claim 7, wherein the device requiring vacuum is a vacuum canister.

12. The system of claim 7, wherein the device requiring vacuum is a vacuum consuming device.

13. A system including a normally aspirated engine, comprising: a device requiring vacuum; an intake manifold of the engine; and an aspirator, comprising: a body defining a converging motive section, a diverging discharge section, at least one suction port, a housing defining a surface, and a Venturi gap located between an outlet end of the converging motive section and an inlet end of the diverging discharge section, wherein the housing surrounds a portion of the diverging discharge section and contains the Venturi gap, and wherein the diverging discharge section of the aspirator is fluidly connected to the intake manifold of the engine and the suction port is fluidly connected to the device requiring vacuum; a first check valve fluidly connected to the Venturi gap and the suction port; and at least one second gap located in the diverging discharge section of the body and downstream of the Venturi gap, wherein a second check valve is fluidly connected to the second gap, and wherein the housing contains the second gap; and at least one check valve element and at least one suction cap, wherein the check valve element is located between the suction cap and the surface of the housing.

14. The system of claim 13, wherein the engine is a normally aspirated engine.

15. The system of claim 13, further comprising an air cleaner and a throttle, wherein the throttle is located downstream of the air cleaner and upstream of the intake manifold of the engine.

16. The system of claim 15, wherein the converging motive section is fluidly connected to the air cleaner, upstream of the throttle.

17. The system of claim 13, wherein the device requiring vacuum is a vacuum canister.

18. The system of claim 13, wherein the device requiring vacuum is a vacuum consuming device.

* * * * *